United States Patent Office 3,485,986
Patented Dec. 23, 1969

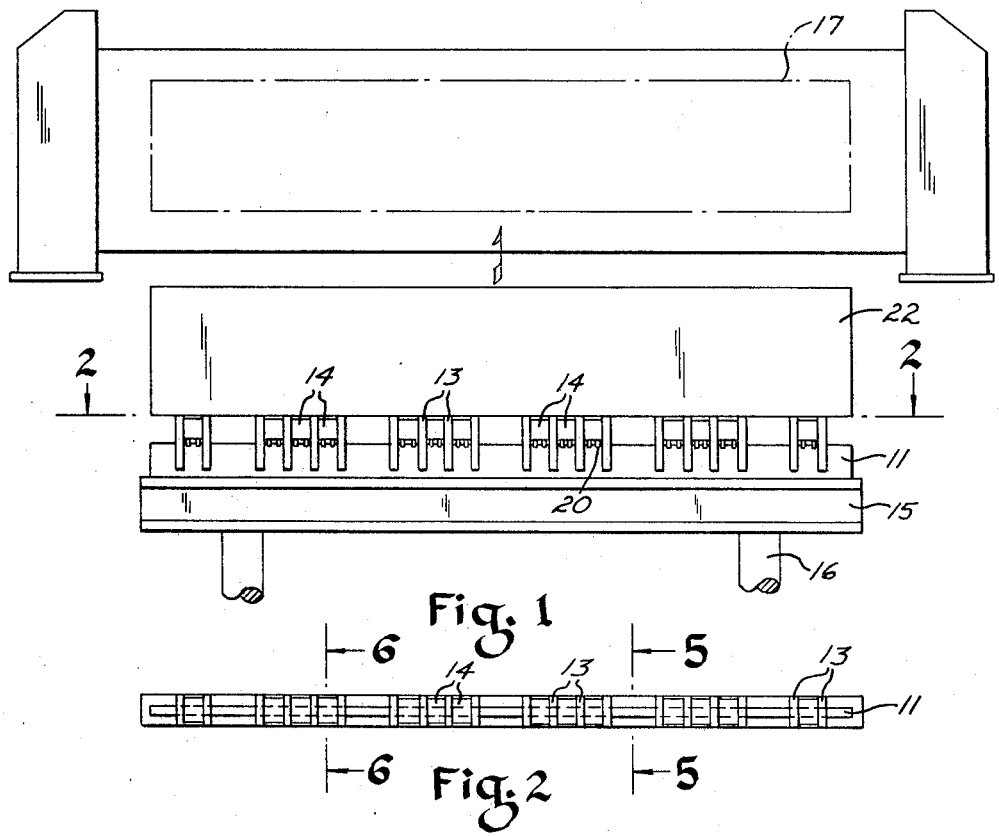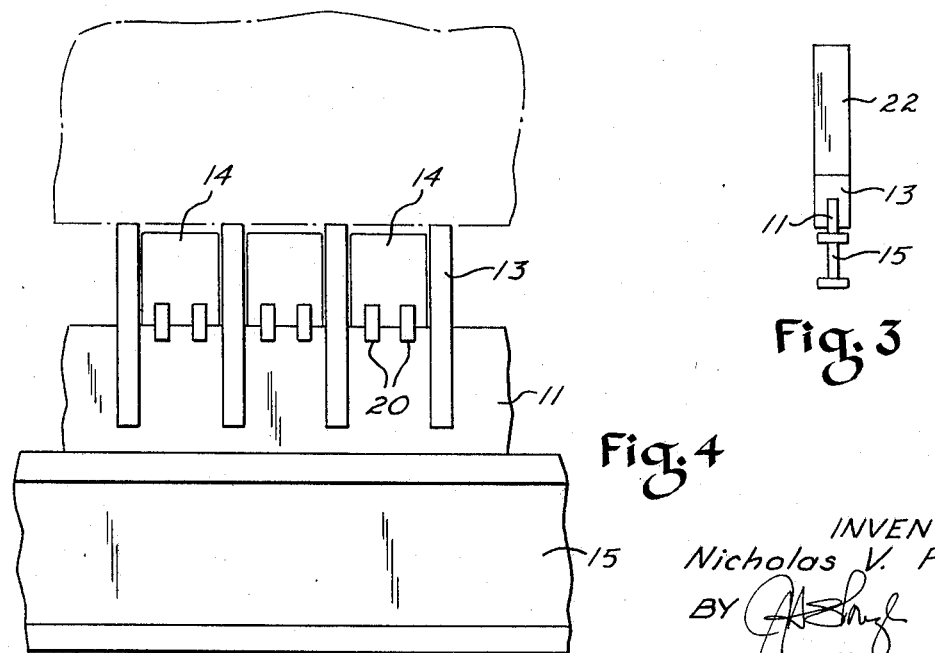

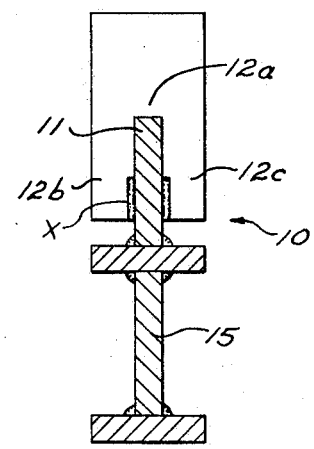
Fig. 5
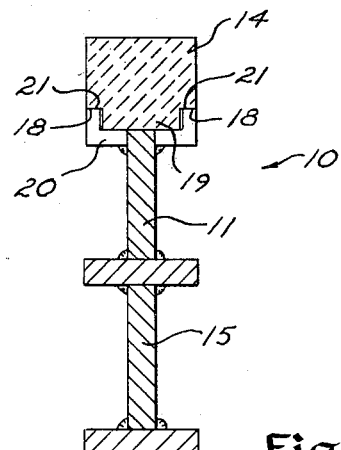
Fig. 6
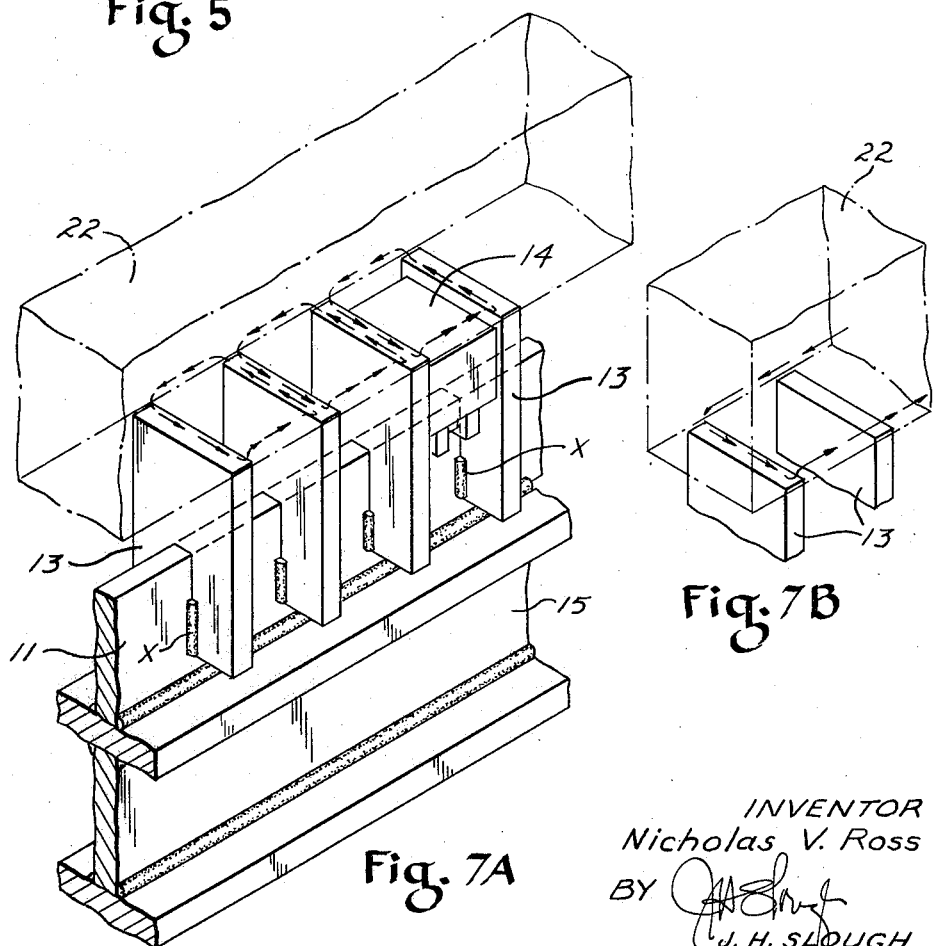
Fig. 7A
Fig. 7B

3,485,986
APPARATUS FOR INDUCTION HEATING OF SLABS
Nicholas V. Ross, Youngstown, Ohio, assignor to Ajax Magnethermic Corporation, Warren, Ohio, a corporation of Ohio
Filed Sept. 25, 1967, Ser. No. 670,028
Int. Cl. H05b 5/00, 9/06, 9/02
U.S. Cl. 219—10.69                         8 Claims

ABSTRACT OF THE DISCLOSURE

A support for supporting a slab wherein the magnetic field throughout said slab is disposed at substantially right angles to the longest dimension of the slab, the current flow being in the direction of the said longest dimension of the slab, the support comprising a bridge member having a plurality of generally parallel fingers traversing the width of said slab and being in the plane of and in the direction of the magnetic field passing therethrough, the stray currents in the slab support being substantially confined to the slab proceeding in the direction of the length of the slab.

---

This invention relates to induction heating means and more particularly relates to induction heating means for heating relatively large units of metal, such as steel, as for example, slabs, billets, bars, ingots, slugs and metal shapes of similar nature.

The invention has particular application to a heater where the slabs are supported on edge, the current flow is in the direction of the longest dimension of the slab and the magnetic field is substantially at right angles to the width which in a vertical mounting becomes the effective height of the slab as shown in co-pending application Ser. No. 670,046 filed Sept. 25, 1967.

The principal object of the invention is to minimize the circulation of stray eddy currents to permit concentration of the heating effect upon the slabs or other metal shapes during heating thereof.

An object of the invention is to provide an improved support for the metal being heated.

A further object is to provide a support wherein stray eddy currents are automatically cancelled.

Another object of the invention is to provide an improved slab, etc. support wherein overheating of the supporting structure is eliminated and thermal stresses and undue buckling and warping is prevented.

A still further object of the invention is to provide a support for an inductively heated metal slab, etc. which will not become inductively heated during inductive heating of the metal slab, etc. supported thereby.

Other objects of the invention and the invention itself will become more readily apparent by reference to the appended description and accompanying drawings, in which drawings:

FIGURE 1 is a side elevation of the support of this invention, a slab of metal being shown thereon and an induction heater being shown thereabove in broken lines;

FIGURE 2 is a top plan view of the support of this invention as viewed from the line 2—2 of FIGURE 1;

FIGURE 3 is an end elevation of the support of this invention;

FIGURE 4 is an enlarged side elevation of a portion of the support of this invention;

FIGURE 5 is a transverse section through the support of the invention taken along the line 5—5 of FIGURE 2;

FIGURE 6 is a transverse section through the support of the invention taken along the line 6—6 of FIGURE 2; and FIGURE 7A is a perspective view of the portion of the support shown in FIGURE 4; and FIGURE 7B is a perspective view of a portion of FIGURE 7A showing a portion of the resultant current loop.

Referring now more particularly to the drawings, in all of which like parts are designated by like reference characters, at 10 is indicated the improved support of this invention which is constructed from materials such as steel, because of its inherent strength particularly at elevated temperatures. The support 10 as shown in FIGURES 1, 4 and 7 is disposed centrally in the bottom of an induction heater and is shown supporting a slab 22 thereon. The support preferably comprises an elongated base or bridge member 11 of steel adapted to act as bridge means for a plurality of metal members 13 of generally inverse U-shaped form acting as support fingers, said fingers being preferably made of non-magnetic steel, the yoke 12a of said U being disposed across the upper surface of the member 11 and a pair of depending legs 12b and 12c disposed over and on either side of said bridge member.

The said support fingers 13 are disposed over the elongated bridge member in spaced parallel relation to each other and may be loosely mounted to compensate for thermal expansion of the load, or may be secured to the said base as by welding indicated at x, cleats, lugs, bolts or the like. Between each adjacent pair of support fingers 13 on either side of the bridge member 11, pairs of L-shaped retainer arms 20 are secured to the bridge which form a cradle for a refractory block 14 positioned therebetween. Each of said refractory blocks are preferably loosely disposed between each pair of adjacent spaced fingers, as best shown in FIGURES 1, 4 and 6 and are of lesser heighth than said fingers and are preferably T-shaped in cross-section affording a pair of spaced shoulders 18, 18 and a central depending projection 19. The projection 19 rests within the cradle formed by the oppositely disposed arms 20 and the shoulders 18, 18 rest upon the upper surfaces 21 of opposite arms.

The base member 11, as best shown in FIGURES 1 and 2, is disclosed as mounted upon an elongated I-beam 15 or the like, which may be stationarily mounted on a floor, etc. or upon lift means 16, as shown in FIGURE 1, for raising and lowering the support into position beneath the slab etc., or for raising and lowering the slab etc. into and out of heating position within the heater, indicated generally in broken lines at 17 in FIGURE 1.

The support fingers are dimensioned so that they are preferably one times the electrical depth of penetration of the material used therein, e.g. stainless steel, and not greater than one and one-half times said depth of penetration. As an example, the support fingers preferably approximate the electrical depth of penetration of steel which is, for example, 2.75 inches at 60 cycles per second to provide proper stress limits. The bridge member is further dimensioned in similar manner so that proper stress limits are provided therein.

In FIGURE 7, the arrows indicate the direction of flow of stray eddy currents, the current forming loops when a slab is placed on the support fingers which, it will be noted, are disposed in the plane of and in the direction of the magnetic field. When induction heating is applied to the load, it is to be noted that that portion of the loop of stray eddy currents indicated by the arrows cancels out an adjacent portion of an adjacent loop, the said portions of the loops cancelled being those crossing the intermediate support fingers and thus the current flow in effect is a single loop proceeding longitudinally in the direction of the length of the slab as illustrated in FIGURE 7B and which, in the form shown herein, is of greater length than width; wherefor the current flow is directed along the bottom edge of the slab thus effecting concentration of the heating in the slab where it is desired. It is to be noted further that the bridge member, or a plurality of bridge member if desired, which are used to space and position the slab supporting fingers is in the form shown, centrally located, and it is to be noted that a pair of parallel bridges should not be employed since a circulating path would be thus provided and hence an additional heating load.

Although an I-beam 11 is shown as a base for the supporting structure, it is contemplated that an offset support might be provided therefor removed from the magnetic field.

It will be understood that many changes of the details of the present invention, as herein described and illustrated, may be made without, however, departing from the spirit of this invention or the scope of the appended claims.

I claim:

1. A supporting structure for supporting slabs being heated on edge in an induction heater, the current flow being in the direction of the longest dimension of the slab and the magnetic field at right angles to the width thereof, said structure adapted to project from below into said heater, said supporting structure comprising a bridge member of non-magnetic metal, a plurality of upwardly extending spaced generally parallel fingers of non-magnetic metal of a dimension not greater than one and one-half times the electrical depth of penetration of the material of the fingers, said fingers traversing the width of the slabs supported thereby, said fingers being mounted on and disposed over said bridge member and being in the plane of and in the direction of the magnetic field passing through said slabs during heating, stray eddy currents crossing the said support fingers cancelling out and the stray eddy current flow proceeding longitudinally in the direction of the length of the slab.

2. Apparatus as claimed in claim 1, wherein said fingers are loosely secured to said bridge member.

3. Apparatus as claimed in claim 1 wherein cradles for said refractory material are provided by means secured on opposite sides of said bridge member.

4. Apparatus as claimed in claim 1, wherein said metal articles being heated in said induction heater are metal slabs of relatively greater longitudinal extent than width, the bridge member being relatively spaced from said slabs and of substantially greater longitudinal length than width, substantially supporting by the fingers mounted thereon the greater length of said slab.

5. Apparatus as claimed in claim 1 wherein said fingers are of generally inverse U-shaped form and are mounted on said bridge member with portions thereof overlapping opposite sides of said bridge member.

6. Apparatus as claimed in claim 1 wherein the bridge member is relatively narrow and centrally disposed beneath the metal article supported by said fingers, said fingers extending upwardly and laterally on opposite sides of said bridge member.

7. Apparatus as claimed in claim 1 wherein the bridge member is of a dimension not greater than one and one-half times the electrical depth of penetration of the material of the bridge.

8. A supporting structure as claimed in claim 1 wherein a plurality of blocks of refractory material are mounted upon said bridge member between adjacent spaced one of said fingers and said fingers project upwardly thereof wherefor said blocks are in relatively spaced vertical relation to said slabs supported by the fingers.

References Cited

UNITED STATES PATENTS

| | | | |
|---|---|---|---|
| 2,875,995 | 3/1959 | Troglione | 263—6 |
| 2,978,237 | 4/1961 | Frank | 263—6 |
| 3,291,954 | 12/1966 | Scheffler | 219—10.71 X |

JOSEPH V. TRUHE, Primary Examiner

L. H. BENDER, Assistant Examiner

U.S. Cl. X.R.

219—10.67, 10.71, 10.79; 263—6; 266—5